United States Patent [19]

Lee

[11] Patent Number: 5,205,645
[45] Date of Patent: Apr. 27, 1993

[54] HALOGEN FLOOD LIGHT WITH A FOLDAWAY STAND

[76] Inventor: Jin T. Lee, No. 65, Tan-Fu Rd. Sec. 2, Ta-Feng Tsun, Tan-Tgu, Taichung Hsien, Taiwan

[21] Appl. No.: 829,269
[22] Filed: Feb. 3, 1992
[51] Int. Cl.⁵ .................................... F21S 1/10
[52] U.S. Cl. .................................... 362/431; 362/287; 362/371; 362/427
[58] Field of Search ............... 362/285, 287, 368, 370, 362/371, 382, 403, 418, 419, 427, 431; 248/130, 178, 278, 183

[56] References Cited

U.S. PATENT DOCUMENTS

| | | | |
|---|---|---|---|
| 2,220,220 | 11/1940 | Cusimano | 248/278 |
| 4,061,912 | 12/1977 | LeVaseur | 362/287 |
| 4,208,703 | 6/1980 | Orr | 362/427 |
| 4,480,809 | 11/1984 | Healey | 362/371 |
| 4,530,040 | 7/1985 | Petterson | 362/285 |
| 4,616,218 | 10/1986 | Bailey et al. | 248/178 |
| 4,638,970 | 1/1987 | Phelan | 362/418 |
| 4,712,168 | 12/1987 | Scherrer | 362/427 |

Primary Examiner—Ira S. Lazarus
Assistant Examiner—Y. Quach

[57] ABSTRACT

A structure improved foldaway stand of a halogen flood light comprises a lamp head 20 and a foldaway stand 30 which is composed of two U-shape legs 31,32 having two round through holes 311,312 near the top ends, together with two triangular positioning lugs 313,314 at the bottom corners of the outsider leg 31 and two oblong through holes 321,322 near the top ends in cooperated with two recessed notch 325,326 at the bottom corners of the insider leg 32, in addition to a crescent piece of fulcrum 324 at the top end of the insider leg 32 possessing several functions such as the engagement of the stand 30 with the lamp head 20, the variation of illuminative angles on the light and stability of folding and unfolding of the stand 30, incorporated with a handle bail providing the convenience to the customers upon removal.

1 Claim, 4 Drawing Sheets

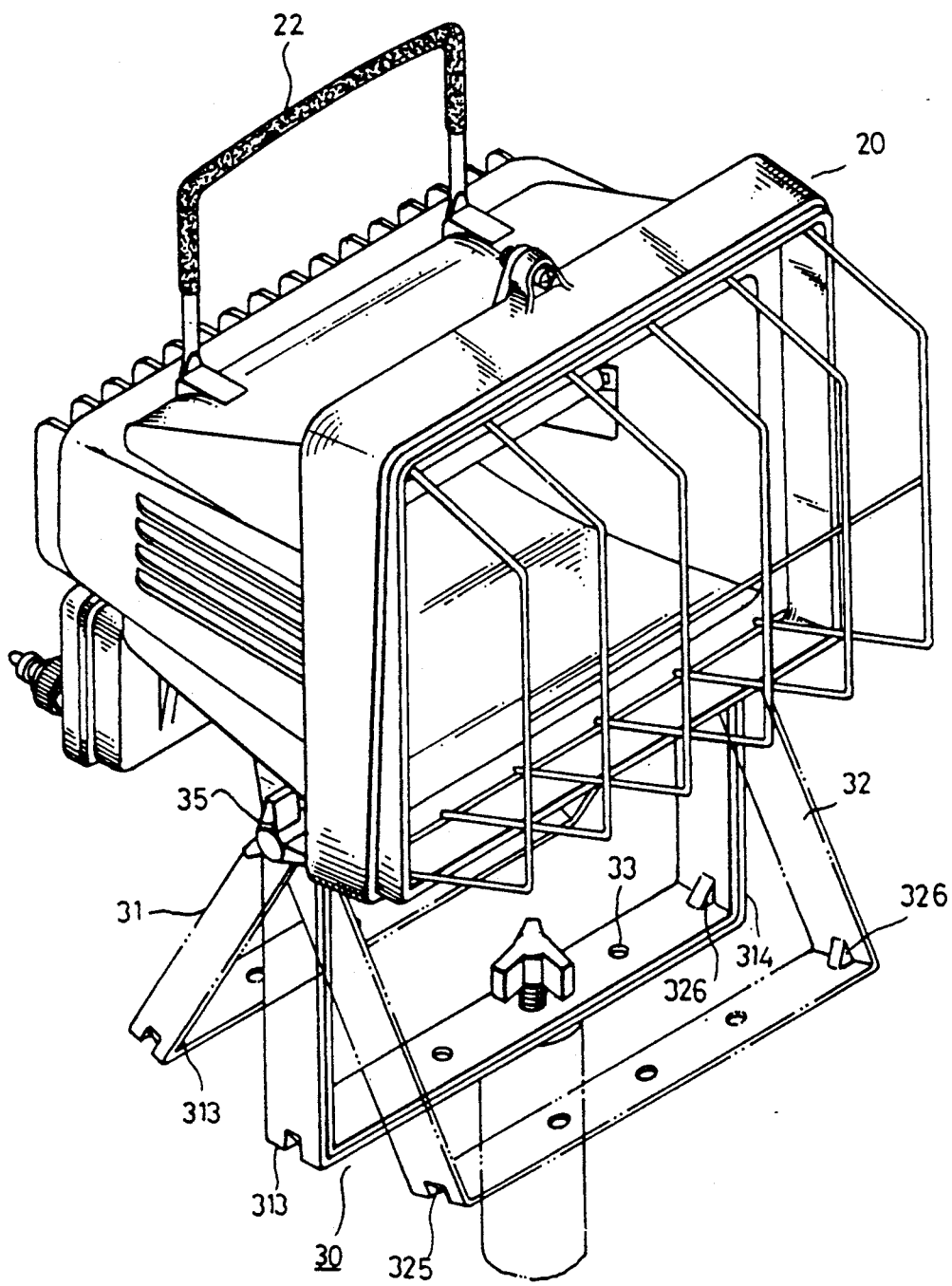
F I G. 2

HALOGEN FLOOD LIGHT WITH A FOLDAWAY STAND

BACKGROUND OF THE PRESENT INVENTION

The present invention relates to a foldaway stand of a halogen flood light, particularly to a structure improved stand of the light, aiming to have the light to be portable, removable. Especially, the illuminative angle of the light can be variable.

A halogen flood light of the prior art (referring to FIG. 1 shows in a perspective view) usually comprises an adjustable cylindrical shaft 11, a U-shape frame 12 and a lamp head 13, having spiral holes 131 been prepared on the lateral sides near the bottom portion of the lamp head 13 to which the U-shape frame 12 is engaged in with two band driven screws 14 inserting through the round holes 121,122 near the top ends of the frame 12 into the spiral holes and fastening until being firmly fixed up.

More than one screw holes 123 having been drilled on the bottom portion of the U-shape frame 12 serve as the connection points between the frame 12 and the cylindrical shaft 11. Being connect with the two components, it is to insert the top portion of the shaft 11 into the medium hole 123 on the frame 12 and fastened by a hand driven nut 115. The top portion of the shaft is made of a spiral mandrel 114 wrapping up in a stretching out from the top of the shaft 11. In addition, there is a jacket 113 made incorporated with and standing at the top centre of a tripodic stand 112 which is assumed to be a sheath to the shaft 11 possessed two basic functions as to burden the whole weight of the lamp head 13, and to shift the height of the light at different level. Thus the lamp height can be adjusted so as to make the shaft 11 vertically ascendant or descendant inside the jacket 113 and fixed by a hand driven screw 115 upon at a certain level.

However, the adjustment of height level for the lamp head is somewhat limited because of the shaft length that unable the shaft moving too far from the bottom of the jacket 113. Besides, the standing stability of the light is first of all to be considered.

The conventional halogen flood light can be also suspended or hung up on the wall in an intention of changing the illuminative angle of the light from parallel into downward. But it is still restricted for the sticky connection point on which there is lacking of any sliding device performing the vertical adjustment for the lamp head, especially with slight movement.

Some users try to make the light shining upwardly by giving the light a tilt on a successive support. Yet this is an unsuitable attitude that should not be taken favorably. Because in such a condition, any slight impact on an unbalanced object might cause an unavoidable accident of falling down.

Other inventor has disclosed a new model for the previously discussed light by turning the illuminative angle upwardly in order to meet the requirement in the garages for their motor repairment. But it does no help to the structure improvement over the conventional stand of flood light. Moreover, it does not economic for a customer have to have two flood light with different illuminative angle.

So far, the disadvantages over the structure failure of the light stand in prior art are quite obvious, still pending for a solution.

Being aware of this, the inventor has worked earnestly in research and development until he is succeeded in the disclosure of the present invention.

SUMMARY OF THE PRESENT INVENTION

A halogen flood light with a foldaway stand comprises a lamp head and a foldaway stand which is composed of two U-shape legs with more than one round through holes on the bottom portion of the two legs. Two round through holes near the top ends of the outsider leg serve merely for the engagement of the stand to the lamp head. Two oblong through holes near the top ends of the insider leg provide an optional changing of various illuminative angles for the lamp head by sliding itself to and fro on the hand driven screws. Two triangular positioning lugs in cooperated with two recessed notchs at the bottom corners of the two legs provide a firm holding up to the foldaway stand. In addition to a handle bail on the top of the lamp head also provides a convenience to the customers upon removal of the light from a working site to another.

Furthermore, there is a crescent piece at the top end of one insider leg serving as a fulcrum to the outsider leg which is used to share most tensions transferred from the hand driven screws and to keep the U-shape legs from overflattening.

Additional more than one holes prepared on the bottom portion of two legs at respective positions are made ready for those customers who might connect successive supports with the foldaway stand of the present invention.

BRIEF DESCRIPTION OF THE DRAWINGS

Referring to FIG. 2, shows a perspective view of the present invention in which the foldaway stand is shown both in folding up and unfolding conditions in addition to a suggested support in broken lines.

DETAILED DESCRIPTION OF THE PREFERRED EMBODIMENT

Figure 1:
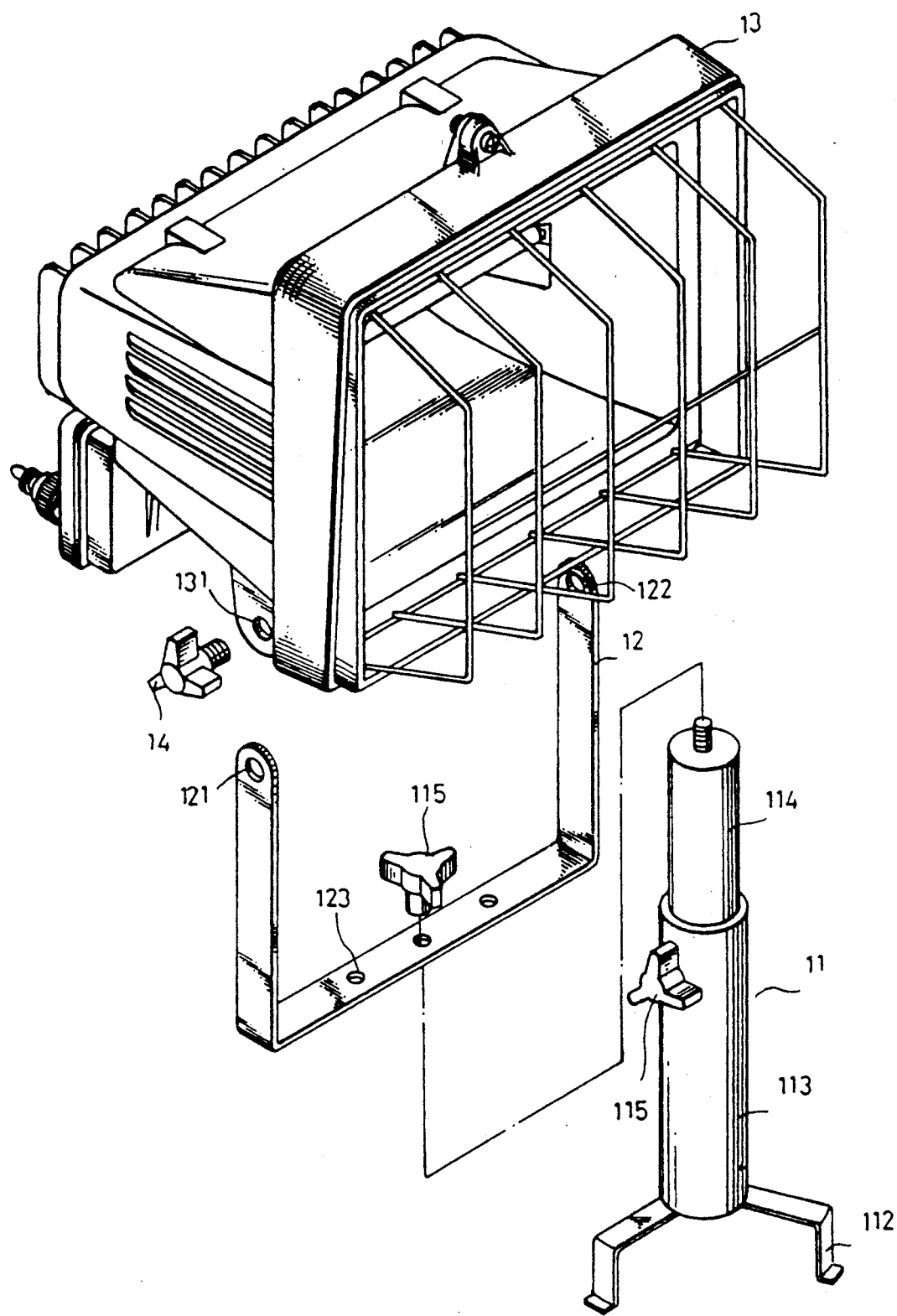
Referring to FIG. 1, shows a perspective view of the prior art including a lamp head, a U-shape frame and a tripodic stand.
Figure 3:
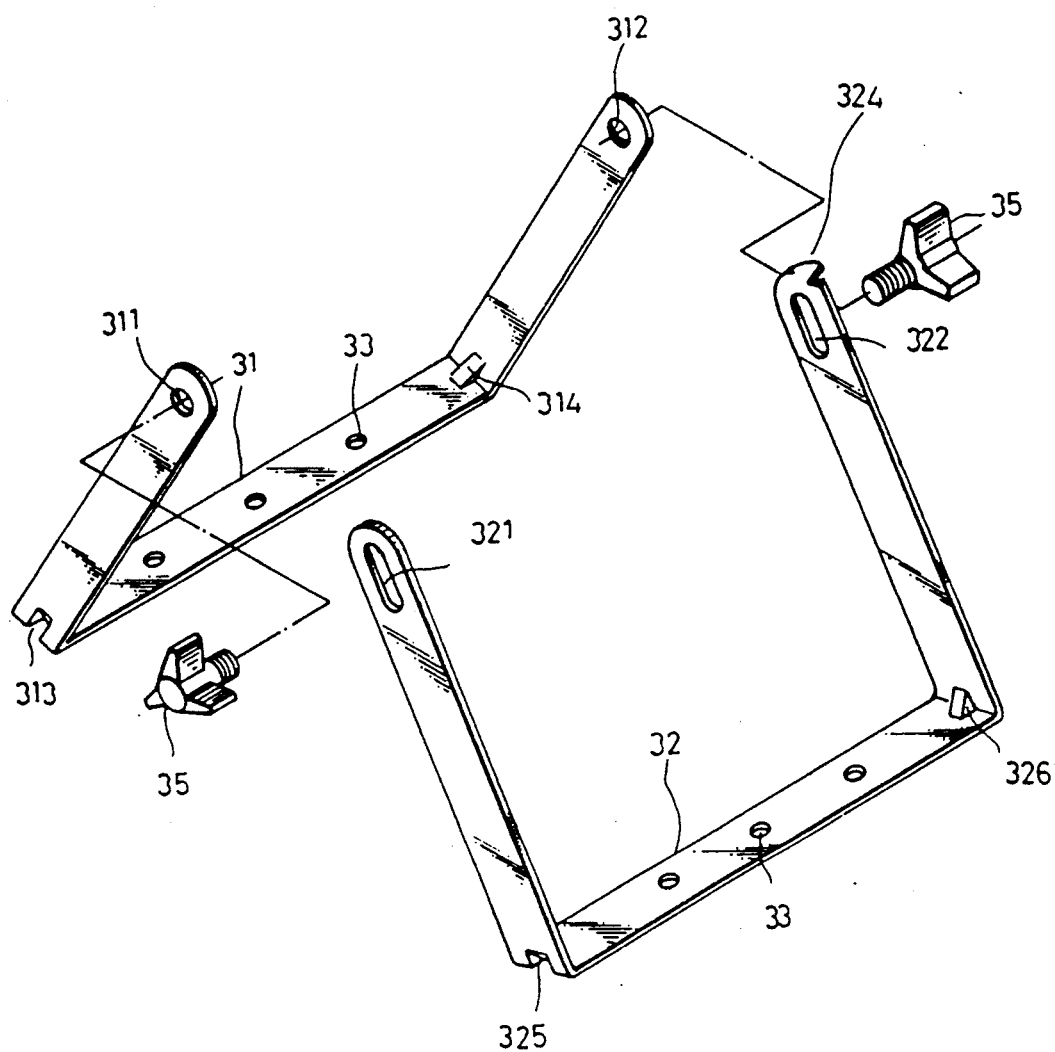
Referring to FIG. 3, shows a perspective view of the foldaway stand to be assembled with hand driven screws.
Figure 3:
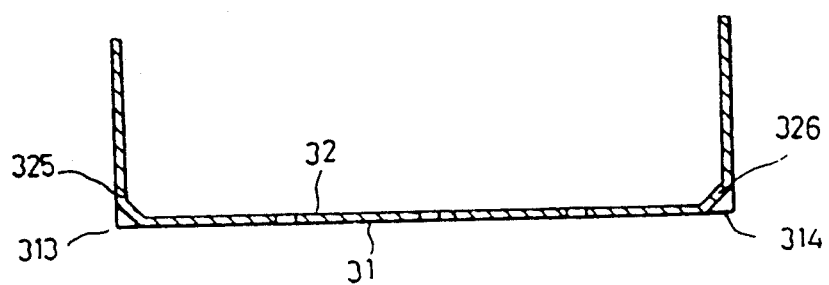

Accordingly, the present invention (shown in FIG. 2 of a perspective view) of an improved structure on a foldaway stand of a halogen flood light comprises a lamp head 20 and a foldaway stand 30. Two spiral holes (not shown behind screws 35 but similar to holes 131 in FIG. 1) prepared separately on the lateral sides near the bottom portion of the lamp head 20 to which the stand 30 is engaged in. The foldaway stand 30 is composed of two U-shape legs 31,32 which are made of ductile metal in flat strip form. More than one through holes 33 set on the bottom portion of both legs 31,32 at respective positions, in addition to that two round through holes 311,312 (shown in FIG. 3) set closed to the top ends of the outsider leg 31 and two oblong through holes 321,322 set near the top ends of the insider leg 32. Both of the two U-shape legs 31,32 are to be engaged in the identical spiral holes by hand driven screws 35 in the manner of that first insert the screw into the round through holes 311,312 on the outsider leg 31, then the oblong through holes 321,322 on the insider leg 32 subsequently, aiming until the screws 35 reached those spiral holes and fasten it so as the components are firmly secured in their proper positions.

To prevent any of the oblong through holes 321,322 on the insider leg 32 from sliding out of control and making an overturn of the flood light, a crescent piece has necessarily been formed on one top of the insider leg 32 (shown in FIG. 3) which serves as a fulcrum 324 to keep the two legs 31,32 from overflattening. Besides, most of the tension on the screws are therefore transferred onto the fulcrum, so that the stand will be settled more stably.

Figure 4:
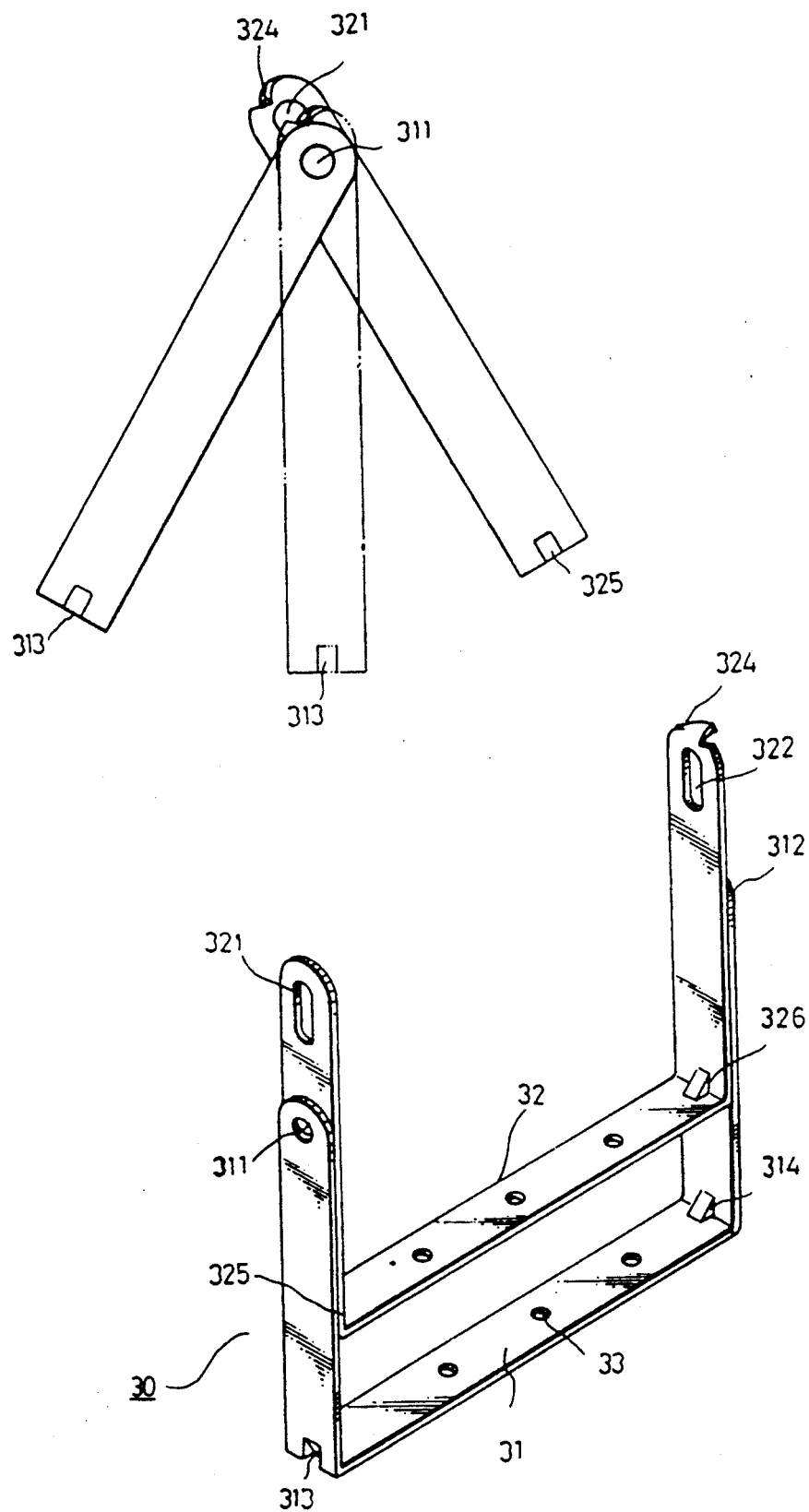
Referring to FIG. 4, illustrates a perspective view of the foldaway stand in folding up condition and two front views indicating the conditions of the triangular positioning lugs of the outsider leg in cooperate with the recessed notch on the insider leg.

Another characteristic feature designed on the foldaway stand 30 (shown in FIG. 3 and FIG. 4) is that there are two triangular positioning lugs 313,314 formed symmetrically and respectively at the bottom corners of the outsider leg 31 and two recessed notches 325,326 set in cooperating with at the respective corners of the insider leg 32. The lugs 313,314 will be registered in their respective recessed notches 325,326 firmly upon the folding up of the stand 30.

An extraordinary handle bail 22 (shown in FIG. 2) being attached on the top of the light 20 provides a hand carrying convenience to the users as they move the light from one working site to another.

The present invention of an improved foldaway stand of the halogen flood light is disclosed to provide unique advantages such as the free shifting for various illuminative angles, a firm folding device and a handle bail, which have the light to be portable and removable and the illuminative angle variable, in addition to that there are round through holes on the bottom portion of the U-shape legs at respective positions set ready for excessive support to be connected.

The inventor who searched thoroughly found nothing similar to the present invention in the market. It is therefore no doubt on the novelty and eligibility of this invention of which is to be patentable. Thus the scope of this invention should be determined by the appended claims and their legal equivalents rather than by the examples given.

I claim:

1. A foldaway stand of a halogen flood light comprises a foldaway stand, a lamp head with two spiral holes on the lateral sides near a bottom portion of the lamp head, and a handle bail on top of the lamp head wherein; said foldaway stand is comprised of two U-shape legs with more than one round through holes on a bottom portion of two U-shape legs at respective positions, two round through holes near the top ends in associated with two triangular positioning lugs at the bottom corners on an outsider leg and two oblong through holes with a crescent piece near one top end in cooperated with recessed notches at the bottom corners on an insider leg; said two oblong through holes near the top ends of said insider leg to be sliding to and fro on two hand driving screws fastening to said two spiral holes for obtaining various illuminative angles for said lamp head; said two round through holes near the top ends of said outsider leg serving merely the engagement of said foldaway stand to said lamp head; said two triangular positioning lugs in cooperated with said recessed notches at the bottom corners of said insider leg providing a firm folding up to said foldaway stand; said crescent piece at one top end of said insider leg serving as a fulcrum to keep said two U-shape legs from overflattening and sharing most tensions from the two hand driving screws; said handle bail providing conveniency to customers upon removal of said halogen flood light; said more than one round through holes on the bottom portion of said two U-shape legs being prepared ready for connection of successive support.

* * * * *